UNITED STATES PATENT OFFICE.

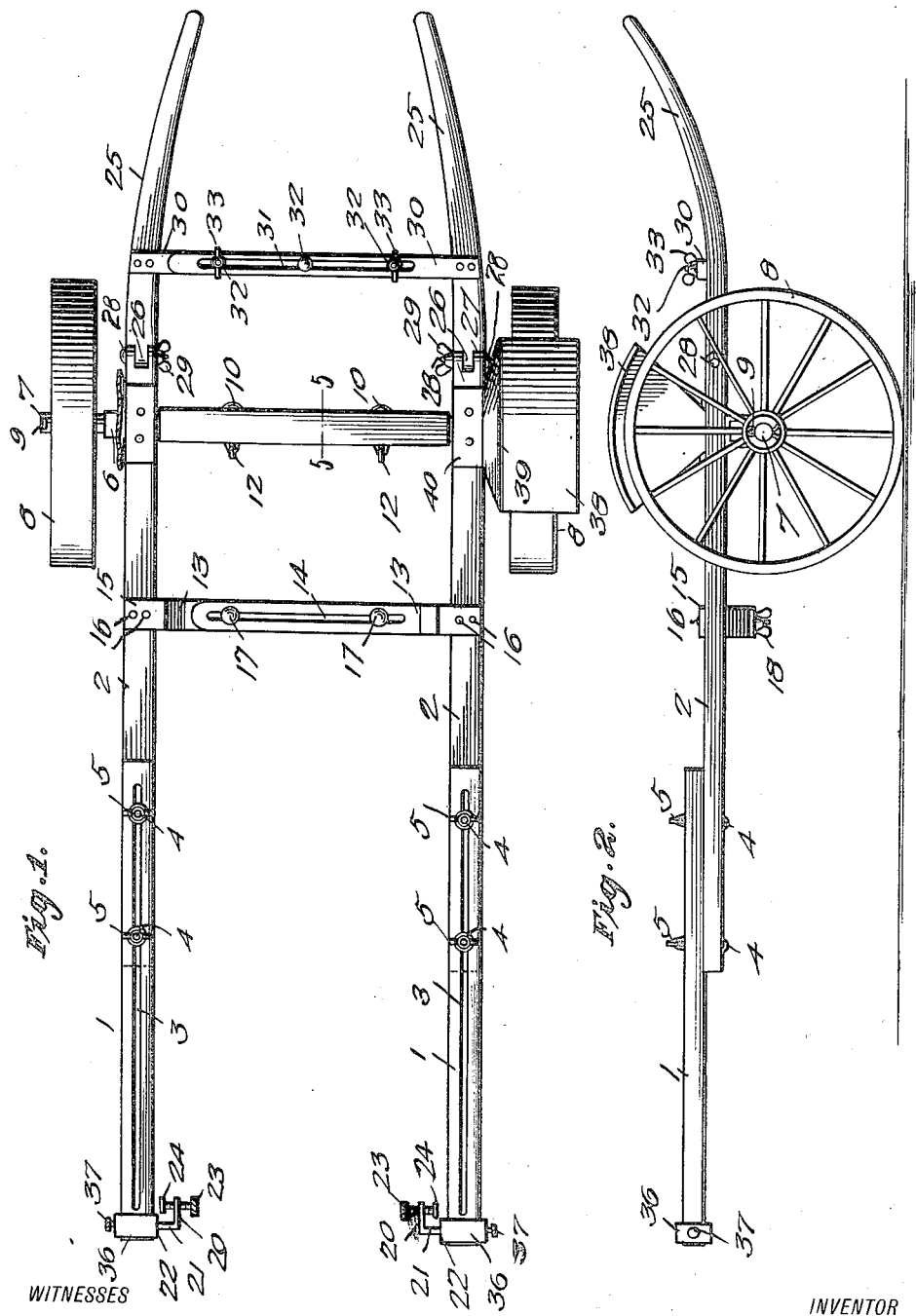

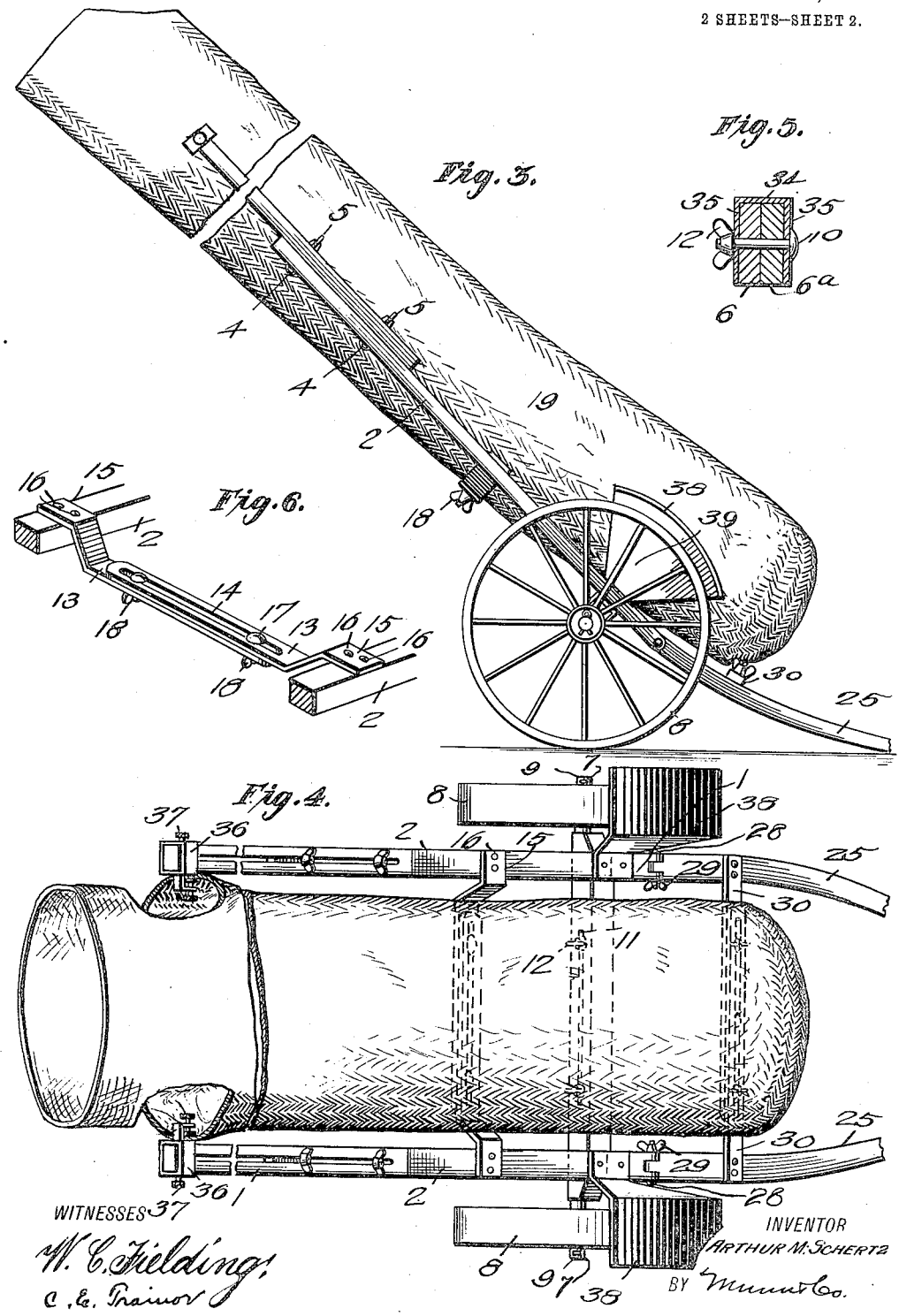

ARTHUR M. SCHERTZ, OF SCHERTZ, TEXAS.

HARVESTER-BAG CARRIER.

1,122,805.   Specification of Letters Patent.   Patented Dec. 29, 1914.

Application filed June 2, 1914. Serial No. 842,406.

*To all whom it may concern:*

Be it known that I, ARTHUR M. SCHERTZ, a citizen of the United States, and a resident of Schertz, in the county of Guadalupe and State of Texas, have invented a new and useful Improvement in Harvester-Bag Carriers, of which the following is a specification.

My invention is an improvement in harvester bag carriers, and has for its object to provide a device of the character specified for supporting a bag of sufficient size to receive a large amount of cotton or the like, for instance, the collection of a half day's work of a single picker, and wherein adjustable mechanism is provided for supporting the bag out of contact with the ground, and wherein the support is mounted on wheels to permit the easy transportation of the bag and the support.

In the drawings:—Figure 1 is a top plan view of the support, Fig. 2 is a side view, Fig. 3 is a similar view with a bag in place on the support, Fig. 4 is a top plan view of Fig. 3, Fig. 5 is a section on the line 5—5 of Fig. 1, and Fig. 6 is a perspective view of the sectional connecting plate and adjacent parts.

The present embodiment of the invention comprises a pair of parallel sectional bars arranged in spaced relation and connected together in a manner to be described, each bar consisting of sections 1 and 2. The sections 1 of each of the bars is longitudinally slotted as indicated at 3, and the section 2 of each bar is provided with openings for receiving bolts 4. The bolts are passed from below upward through the openings and through the slot 3 of the adjacent section 1, and each bolt is engaged by a wing nut 5 above the section 1.

A sectional axle is arranged transversely of the rear ends of the sections 2, the sections 6 and 6ª lapping at their inner ends and having spindles 7 at their outer ends, upon which are journaled wheels 8. Cotter pins 9 are passed through the outer ends of the spindles to hold the wheels in place, and bolts 10 are passed through registering slots 11 extending longitudinally of the sections, and each bolt is engaged by a wing nut 12, for holding the sections in adjusted position.

In front of the axle, the sections 2 are connected by a sectional cross bar. Each of the sections 13 of the cross bar is provided with a longitudinally extending slot 14 at its inner end and with a laterally offset portion 15 at its outer end, the portions 15 lapping upon the outer faces of the sections 2 and being secured thereto as shown at 16. The bodies of the sections are thus below the level of the lower faces of the sections 2, as shown more particularly in Fig. 2, and bolts 17 are passed through the slots 14 from above downward, and are engaged by wing nuts 18, below the lowermost section.

It will be evident that by loosening the wing nuts 12 and 18, the longitudinal bars 1—2 may be moved laterally with respect to each other, to provide for bags of different diameters. The effective length of the bag supporting portion of the truck may also be varied by loosening the nuts 5. The slots 3 extend almost the full length of the sections 1 as shown in Fig. 1, so that a large amount of adjustment is permitted.

Means is provided for engaging the mouth of the bag 19, as shown more particularly in Figs. 1 and 4, the said means comprising angle plates each consisting of a portion 20 and a portion 21, arranged at approximately a right angle with respect to each other. Each of the portions 21 is provided with a cross head or plate 22 at the end remote from the portion 20, and this cross head or plate is lapped upon the inner edge of the adjacent section 1 and is secured thereto in any suitable manner.

A set screw 23 is threaded through each of the portions 20, and each set screw is provided with a head 24, at its inner end for clamping the edge of the mouth of the bag against the adjacent section 1. The bag is arranged as shown in Figs. 3 and 4, the mouth of the bag being held by the clamping devices constituted by the angle plates and the set screws, and the body of the bag is supported by the sectional cross bar and the axle.

A balance bar 25 is pivoted to each of the bars 1—2, in rear of the axle, and each balance bar is curved longitudinally in two directions as shown in Figs. 1 and 2. The bars are curved inwardly and upwardly, and each bar is gradually reduced in cross section from its connection with the adjacent section 1 to its free end. Each of the bars 25 is provided with a single longitudinally extending lug 26 at its inner end, which is received between a pair of laterally spaced lugs 27 at the adjacent end of the adjacent section 2. Bolts 28 are passed through registerings in the lugs, and each bolt is engaged by a wing nut 29 on the inner face of the section 2. The balance bars are connected by a sectional cross bar, the said bar consisting of similar sections 30, each of which is longitudinally slotted as indicated at 31. Bolts 32 are passed through the registering slots, and are engaged by wing nuts 33 to clamp the sections together. The balance bars are hinged to the sectional bars 1—2, and by loosening the wing nuts 29, the balance bars 25 may be adjusted with respect to the longitudinal bars 1—2.

The bag 19 as shown in Figs. 1 and 2, also rests upon the sectional cross bar which connects the balance bars, and the balance bars are adjusted laterally at the same time that the sectional bars 1—2 are adjusted. The sections 6 and 6ª of the axle fit alongside each other as shown in Fig. 5, and a housing consisting of a top wall 34 and side walls 35 incloses the sections. The housing is slotted to correspond with the slots of the sections, and the bolts 10 pass through the slots of the housing. The housing is of a length to extend between the sections 2 at their closest adjustment.

In use, the bars 1—2 are adjusted to the proper width, and held in position by tightening the nuts 18—12 and 33. Sectional bars 1—2 are adjusted with respect to each other and secured in the desired position, after which the bag is arranged as shown in Fig. 3, the material of the bag being clamped by the set screws 23 against the sections 1.

The balance bars 25 are adjusted to hold the mouth of the bag in convenient position for the picker to put the cotton or other material into the mouth, after which the device is ready for operation. The picker draws the truck around with him through the field, and preferably the bag is of such size that it will hold at least the picking of a half a day. Thus the picker is relieved of the necessity for emptying the bag at frequent intervals, and a large amount of wear on the bag is eliminated. It is a fact that thousands of dollars are paid out every year by cotton farmers for bags, the bags being worn out by dragging them over the stones and the brush of the field. When the picker desires to compress the cotton in the sack, he will loosen the nuts 29 slightly, and will then swing the ends of the section 1 upward so that the sack is approximately vertical. He may now shake the sack to compress the cotton.

Preferably the angle plates 20—21 are mounted on collars or sleeves 36, which are adjustable longitudnally of the sections 1. Each collar may be provided with a set screw 37 for securing it in adjusted position if desired, and by loosening the set screws 37 the collars may be adjusted to hold the mouth of the bag at any desired point. This arrangement is to permit the mouth of the bag to be placed in convenient position to insert the cotton or other material being picked. As the bag fills it may be shaken down and the mouth of the bag may be moved outwardly in accordance with the amount of cotton inserted.

Fenders are provided for the wheels 8, each fender consisting of an arc-shaped guard 38, arranged above the wheel and each of the guards is a lateral flange at the end of a substantially triangular body 39. Each of the bodies is provided at the opposite end from the guard or fender with a lateral lug 40, and each of the lugs is secured to the adjacent section 2 of the bar 1—2. It will be noted from an inspection of the drawing that the mouth of the bag extends beyond the carrier a distance of approximately 18 inches to permit the picker to work without interference from the carrier.

I claim:—

1. A device of the character specified, comprising a pair of spaced parallel sectional longitudinal bars, one section of each bar being longitudinally slotted and bolts passing through the other section of each bar and through the slot of the first-named section, nuts engaging the bolts for clamping the sections together, an axle arranged transversely of the bars at one end thereof, said axle being sectional and the sections fitting alongside each other, means for clamping the sections together, the longitudinal bars being secured to the adjacent sections of the axle, wheels on the axle sections outside of the bars, a sectional cross bar connecting the sections of the longitudinal bars adjacent to the axle, means for securing the sections together in adjusted position, the sectional cross bar being offset downwardly below the longitudinal bars, a balance bar hinged to each of the longitudinal bars at the end adjacent to the axle for vertical swinging movement with respect to the said bar, a sectional cross bar connecting the balance bars, means for clamping the sections of the cross bar together, means for holding the balance bars rigidly with respect to the longitudinal bars, and means in connection with each of the longitudinal bars at the end remote from the axle for clamping the mouth of a bag.

2. A device of the character specified, comprising spaced parallel sectional longitudinal bars, the sections of each bar being adjustable longitudnally with respect to each other, means for securing the sections of each bar in adjusted position, a sectional axle arranged transversely of the bars near one end, one of the bars being connected to each section of the axle and the said sections being movable longitudinally with respect to each other, means for securing the sections in adjusted position, a wheel journaled on each section, a balance bar hinged to each longitudinal bar at the end adjacent to the axle and extending on the opposite side of the axle, means for rigidly connecting each balance bar to the adjacent longitudinal bar, sectional cross bars connecting the longitudinal bars and the balance bars, the sections being movable with respect to each other, means for clamping the sections in adjusted position, and means on the longitudinal bars for holding a bag.

3. A device of the character specified, comprising spaced parallel sectional bars, the sections of each bar being adjustable longitudinally with respect to each other, means for securing the sections of each bar in adjusted position, a sectional axle arranged transversely of the bars near one end, one of the bars being connected to each section of the axle and the said sections being movable longitudinally with respect to each other, means for securing the sections in adjusted position, a wheel journaled on each section, an adjustable connection between the longitudinal bars, and balancing mechanism hinged to the longitudinal bars on the opposite side of the axle, said balancing mechanism being mounted to swing vertically with respect to the bars, means for fixing the balancing mechanism with respect to the longitudinal bars, and means on the longitudinal bars for holding a bag.

4. A device of the character specified, comprising a sectional axle, the sections being movable with respect to each other, means for rigidly connecting the sections, a wheel on each axle section, a pair of spaced parallel longitudinal bars, each bar being connected to one section of the axle, an adjustable connection between the bars, and balancing mechanism connected with the bars on the opposite side of the axle and movable vertically with respect to the bars, and means for fixing the balancing mechanism with respect to the bars, said bars having means for engaging the mouth of a bag.

5. A device of the character specified, comprising a sectional axle, the sections being movable with respect to each other, means for rigidly connecting the sections, a wheel on each axle section, a pair of spaced parallel longitudinal bars, each bar being connected to one section of the axle, an adjustable connection between the bars, balancing mechanism connected with the bars on the opposite side of the axle and movable vertically with respect to the bars, and means for fixing the balancing mechanism with respect to the bars, said bars having means for engaging the mouth of a bag, and each of the said means being adjustable longitudinally of said bar, and having means for securing the said means in adjusted position.

6. A device of the character specified, comprising a sectional axle, the sections being movable with respect to each other, means for rigidly connecting the sections, a wheel on each axle section, a pair of spaced parallel longitudinal bars, each bar being connected to one section of the axle, an adjustable connection between the bars, balancing mechanism connected with the bars on the opposite side of the axle and movable vertically with respect to the bars, means for fixing the balancing mechanism with respect to the bars, said bars having means for engaging the mouth of a bag, and each of the said means being adjustable longitudinally of the adjacent longitudinal bar.

7. A device of the character specified, comprising an axle, a wheel on each end of the axle, a pair of sectional bars secured to the axle and extending forwardly therefrom, each bar consisting of sections connected to the axle and a section slidable with respect to the first section, means for securing the sections of each bar in adjusted position, each bar having means for engaging the mouth of the bag, balance bars adjustably connected with the said first-named bars at the end adjacent to the axle, and a fender secured to each of the first-named bars at the axle and extending above the adjacent wheel.

8. A device of the character specified, comprising an axle, a wheel on each end of the axle, a pair of sectional bars secured to the axle and extending forwardly therefrom, each bar consisting of a section connected to the axle and a section slidable with respect to the first section, means for securing the sections of each bar in adjusted position, each bar having means for engaging the mouth of a bag, and balance bars adjustably connected with the said first-named bars at the end adjacent to the axle.

9. A device of the character specified, comprising an axle, a wheel on each end of the axle, a pair of sectional bars secured to the axle and extending forwardly therefrom, each bar consisting of a section connected to the axle and a section slidable with respect to the first section, and means for securing the sections of each bar in adjusted position, each bar having means for engaging the mouth of a bag, and balancing mechanism adjustably connected with the bars at the end adjacent to the axle from the bars.

10. A device of the character specified, comprising an axle, wheels on the axle, a pair of bars secured to the axle near one end of the bars, balancing mechanism adjustably connected with the bars at the end adjacent to the axle, said axle consisting of sections movable longitudinally with respect to each other, and means for securing the sections together.

11. A device of the character specified, comprising an axle, wheels on the axle, a pair of bars secured to the axle near one end of the bars, and balancing mechanism adjustably connected with the bars at the end adjacent to the axle.

ARTHUR M. SCHERTZ.

Witnesses:
C. W. KOCH,
W. F. VORDENBAUMER.